(12) United States Patent
Lindström et al.

(10) Patent No.: US 8,374,600 B2
(45) Date of Patent: Feb. 12, 2013

(54) METHOD AND ARRANGEMENT IN A TELECOMMUNICATION SYSTEM

(75) Inventors: Magnus Lindström, Spanga (SE); Ghyslain Pelletier, Boden (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 19 days.

(21) Appl. No.: 12/996,851

(22) PCT Filed: Jun. 18, 2009

(86) PCT No.: PCT/SE2009/050768
§ 371 (c)(1),
(2), (4) Date: Dec. 8, 2010

(87) PCT Pub. No.: WO2010/002337
PCT Pub. Date: Jan. 7, 2010

(65) Prior Publication Data
US 2011/0092201 A1    Apr. 21, 2011

Related U.S. Application Data

(60) Provisional application No. 61/078,055, filed on Jul. 3, 2008.

(51) Int. Cl.
*H04W 24/00*    (2009.01)
*H04W 72/00*    (2009.01)
*H04J 3/12*    (2006.01)

(52) U.S. Cl. ............... 455/425; 455/450; 370/528

(58) Field of Classification Search ............ 455/425
See application file for complete search history.

(56) References Cited

U.S. PATENT DOCUMENTS

2009/0168731 A1* 7/2009 Zhang et al. ............ 370/336
2010/0284360 A1* 11/2010 Dalsgaard et al. ........ 370/329

FOREIGN PATENT DOCUMENTS

| WO | 0070897 A1 | 11/2000 |
| WO | 2008084938 A1 | 7/2008 |
| WO | 2009088944 A2 | 7/2009 |

OTHER PUBLICATIONS

International Search Report for PCT/SE2009/050768 mailed Oct. 7, 2009.
3GPP Technical Specification, "3rd Generation Partnership Project; Technical Specification Group Radio Access Network; Evolved Universal Terrestrial Radio Access (E-UTRA) Radio Resource Control (RRC); Protocol specification (Release 8)," XP-002547558, 3GPP TS 36.331 v8.2.0, May 2008, pp. 1-151.

* cited by examiner

*Primary Examiner* — Huy C Ho
(74) *Attorney, Agent, or Firm* — Potomac Patent Group PLLC

(57) ABSTRACT

The present invention comprises a method and an arrangement for priority handling between a measurement gap procedure and an uplink data transmission procedure in an evolved UTRAN. The user equipment (UE) detects an active measurement gap. When the UE receives data into the transmission buffer the received data triggers an uplink data transmission procedure such as a scheduling request procedure or a random access procedure. An evaluation on characteristics information associated with the received data is performed and based on the performed evaluation the UE proceeds with the uplink data transmission procedure or the measurement gap procedure. In case the characteristics information associated with the received data is of high priority, the UE proceeds with the uplink data transmission procedure and cancels the measurement gap procedure. However, if the characteristics information associated with the received data is of low priority, it proceeds with the measurement gap procedure and postpones the uplink data transmission procedure to a later occasion.

30 Claims, 3 Drawing Sheets

METHOD AND ARRANGEMENT IN A TELECOMMUNICATION SYSTEM

FIELD OF THE INVENTION

The present invention relates to a method and arrangement in a telecommunication system, in particular to a method and arrangement for priority handling in an evolved UTRAN (E-UTRAN).

BACKGROUND

UTRAN (Universal Terrestrial Radio Access Network) is a term that identifies the radio access network of a UMTS (Universal Mobile Telecommunications System), wherein the UTRAN consists of Radio Network Controllers (RNCs) and NodeBs i.e. radio base stations. The NodeBs communicate wirelessly with mobile user equipments (UEs) and the RNCs control the NodeBs. The RNCs are further connected to the Core Network (CN). Evolved UTRAN (E-UTRAN) is an evolution of the UTRAN towards a high-data rate, low-latency and packet-optimised radio access network. Further, the E-UTRAN consists of eNodeBs (evolved NodeBs), and the eNodeBs are interconnected and further connected to the Evolved Packet Core network (EPC). E-UTRAN is also being referred to as Long Term Evolution (LTE) and is standardized within the 3rd Generation Partnership Project (3GPP).

Network-initiated mobility is defined in the 3GPP-specification TS 36.331 as part of RRC (Radio Resource Control). The RRC is a concept and a protocol name for a set of control messages exchanged between the UE and the RNC in the LTE/E-UTRAN standard. When a UE is in RRC_CONNECTED mode, i.e. once the UE has an established RRC connection, the network controls UE mobility and decides when the UE shall move to which cell. The network triggers the handover procedure based on a variety of parameters, e.g. radio conditions, load, etc. To facilitate the triggering of the handover procedure, the network may configure the UE to perform measurement reporting. However, the network may also initiate handover blindly, i.e. without having received measurement information from the UE. More specifically, the network initiates the mobility to a UE in RRC_CONNECTED mode, possibly in response to the RRC message MeasurementReport from the UE, by sending the RRC message MobilityFromEUTRACommand As part of RRC control, TS 36.331 specifies measurement configuration. Measurement gaps are periods that the UE may use when performing measurements i.e. no transmissions, neither uplink (UL) nor downlink (DL) transmissions, are scheduled during these periods. Moreover, the UE is always configured with a measurement gap pattern when inter-frequency or inter-RAT (Radio Access Technology) measurements need to be performed, i.e. when serving cell quality drops below a configured threshold value. The measurement gap pattern is characterized by a gap length, 6 ms or 8 ms, and by a gap period, 40 ms or 120 ms. During the measurement gaps, the UE does not need to monitor the PDCCH (Physical Downlink Control Channel) or any other downlink shared channels and the UE does not make any uplink transmissions on UL-SCH (Uplink Shared Channel). The network provides the measurement configuration applicable for a UE in RRC_CONNECTED state. Moreover, the network provides the measurement configuration by means of dedicated signaling i.e. on a signaling radio bearer. In particular, a number of measurement types are defined:

Intra-frequency measurements (measurements at the downlink carrier frequency of the serving cell);
Inter-frequency measurements (measurements at frequencies that differ from the downlink carrier frequency of the serving cell);
Inter-RAT measurements of UTRA frequencies;
Inter-RAT measurements of GERAN (GSM/EDGE Radio Access Network) frequencies;
Inter-RAT measurements of CDMA2000 HRPD (High Rate Packet Data) or 1xRTT (Radio Transmission Technology) frequencies.

A measurement is configured with a reporting criterion and format:

Reporting criteria: The criteria that trigger the UE to send a measurement report. This can either be periodical or a single event description.
Reporting format: The quantities that the UE includes in the measurement report and associated information e.g. number of cells to report.

When a measurement was triggered and the UE has performed the required measurement during the measurement gap, the UE assembles a measurement report and submit the MEASUREMENT REPORT message to lower layers for transmission on a Signaling Radio Bearer (SRB).

In the following the scheduling principles for LTE are described.

In LTE, the uplink MAC scheduler resides in the eNodeB and assigns transmission resources to UEs in the cell. In order to perform these tasks the scheduler needs information about the current buffer state of the UE i.e. whether and how much data the UE buffers in its priority queues. According to the existing framework for buffer status reporting for LTE, buffer status reporting is used by the UE to report to the eNB the amount of data stored in the buffers of the UE for transmission. The eNB uses these reports to allocate resources to the UE, and to prioritize resource allocation between different UEs.

Buffer Status Reports (BSR) and Scheduling Request (SR) are triggered when uplink data arrives in the UE transmission buffer and the data belongs to a radio bearer or a logical channel group with higher priority than those for which data already existed in the buffer. When new data arrives to the transmit buffers of a UE and the UE has no grant for transmission on the PUSCH (Physical Uplink Shared Channel), the UE need to request permission to transmit and consequently a BSR is triggered. If the UE has no PUSCH resource a SR is triggered as well. The SR will either be transmitted on the RACH (Random Access Channel), i.e. a RA-SR will be transmitted, or on dedicated resources on the PUCCH (Physical Uplink Control Channel, i.e. a dedicated SR (D-SR) will be transmitted, if such resources are available. The PUCCH resources for dedicated SR are assigned and revoked by the eNB through RRC.

In 3GPP the following assumptions regarding the behaviour of the UE for transmissions overlapping with the measurement gap have been agreed upon:

The UE does not retransmit on PUSCH in a subframe wherein it is configured to perform a measurement;
The UE shall drop certain UL transmissions overlapping with the measurement gap. The dropped UL transmissions include:
PUSCH transmissions: transmissions, re-transmissions of persistent or scheduled allocations,
CQI (Channel-Quality Indicator) reports on PUSCH and PUCCH
Sounding Reference Signals (SRS);
SRs;
ACK: the measurement gaps are configured by the eNB, therefore the MAC scheduler resided in the eNB can make sure to avoid the overlapping of UE ACK transmissions and the measurement gaps.

Thus, the measurement gap takes priority over the configured PUCCH resource, in particular for SRs.

It has been observed that a problem can occur when the UE performs measurements and a SR opportunity collides with the measurement gap. The buffer status reporting may be delayed to an extent which could in the worst case lead to forcing the UE to drop the connection, i.e. go back to RRC_IDLE state. Thus, UE measurement performance at cell edge could be negatively impaired as measurements could be either not transmitted or not performed.

SUMMARY

As stated above, the prior art solution of the UE behaviour for transmissions overlapping with the measurement gaps could lead to poor network and UE performance. Therefore, it would be desirable to achieve an improved solution of the UE behaviour for transmissions overlapping with measurement gaps which increases the network and UE performance.

The improved solution of the UE behaviour for transmissions overlapping with measurement gaps is achieved by means of a method and a UE according to the independent claims.

According to a first aspect of the present invention a method in a UE for priority handling between a measurement gap procedure and an uplink data transmission procedure is provided. The UE is comprised in a telecommunication system and comprises a transmission buffer for data available for transmission. In the method an active measurement gap is detected and data is received in the transmission buffer. The data triggers the uplink data transmission procedure. Furthermore, the method performs an evaluation on characteristics information associated with the received data and based on the performed evaluation the method proceeds with the uplink data transmission procedure or the measurement gap procedure.

According to a second aspect of the present invention a UE for priority handling between a measurement gap procedure and an uplink data transmission procedure is provided. The UE is arranged to be comprised in a telecommunication system. The UE comprises a transmission buffer for data available for transmission. The UE further comprises a detecting unit adapted to detect an active measurement gap and a receiver adapted to receive data into the transmission buffer. An evaluation unit adapted to evaluate characteristics information associated with the received data is comprised in the UE. Moreover, the UE comprises a processing unit adapted to proceed with the uplink data transmission procedure or the measurement gap procedure based on the performed evaluation.

An advantage of the present invention is that the method and the arrangement according to the present solution minimizes the delay for transmission of important messages such as Access Stratum and Non-Access Stratum control messages by allowing a priority handling based on the importance of the messages.

Another advantage of the present invention is that the method and the arrangement according to the present solution improve measurement performance by enabling the timely delivery of measurement reports. Thus, if the measurement report is delivered in time the network conditions have not changed to the extent causing inaccuracy of the measurement report.

Yet another advantage of the present invention is that the method and the arrangement according to the present solution improve the handover procedure by enabling the timely delivery of measurement reports. Thus, if the measurement report is delivered in time, also the handover decision, the handover preparation, the transmission of the handover command and the handover execution are timely executed, leading to improvement of the handover procedure.

Other objects, advantages and novel features of the invention will become apparent from the following detailed description of the invention when considered in conjunction with the accompanying drawings.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practised in other embodiments that depart from these specific details.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
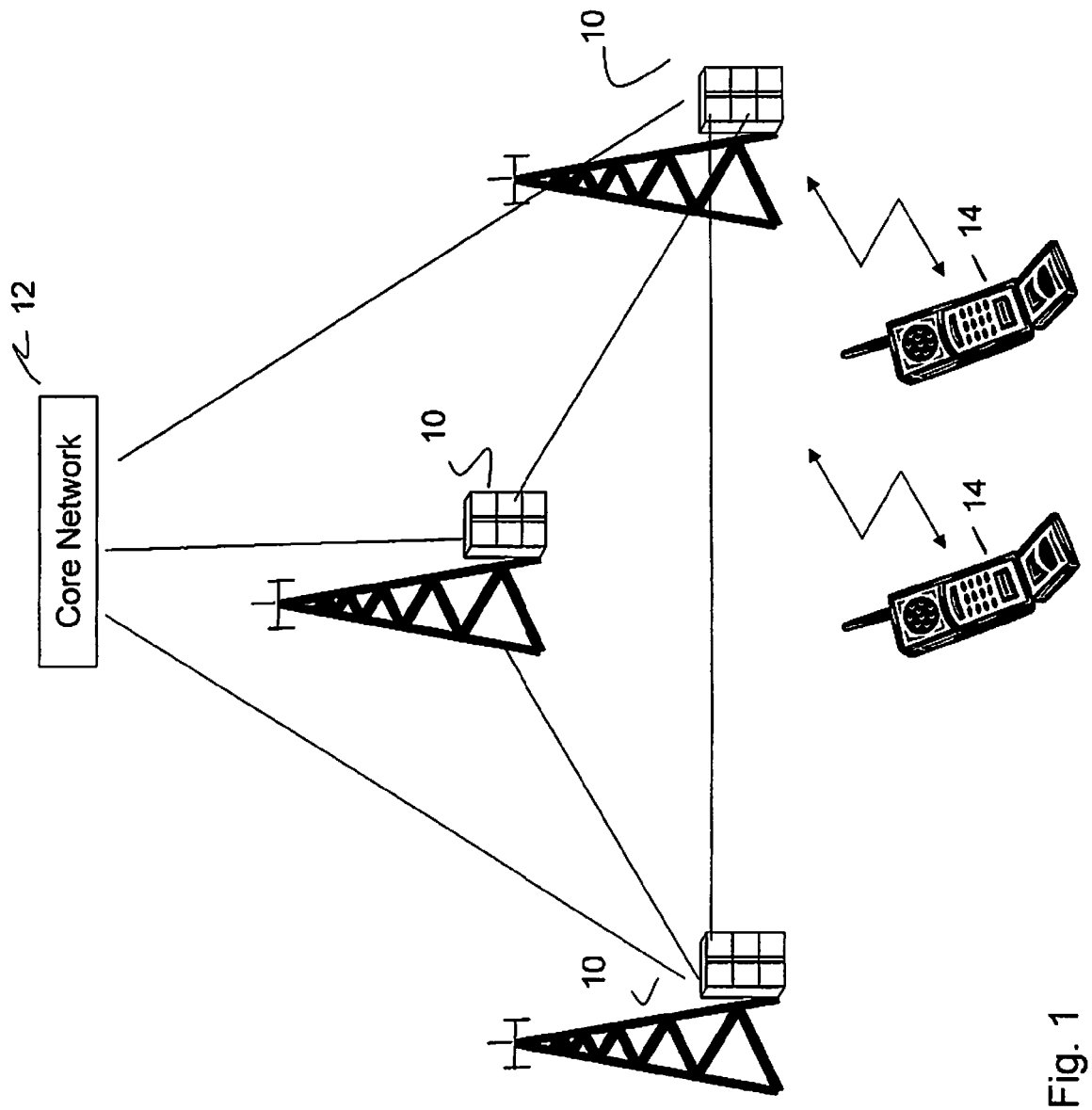
FIG. 1 shows the general architecture of a third generation cellular telecommunications network and its evolutions, wherein the present invention may be implemented.

The general architecture of a third generation cellular telecommunications network and its evolutions is illustrated in FIG. 1, wherein the present invention may be implemented. The cellular telecommunications network is widely deployed to provide a variety of communication services such as voice and packet data. As illustrated in FIG. 1, the cellular telecommunications network may include one or more eNodeBs 10 connected to a core network EPC 12, and a plurality of user equipments (UEs) 14 may be located in one cell. As stated above there is a need for an improved solution of the UE 14 behaviour for uplink transmissions overlapping with measurement gaps in the E-UTRAN. Thus, the present invention comprises a method and an arrangement for priority handling between a measurement gap procedure and an uplink data transmission procedure in a telecommunications network as illustrated in FIG. 1. The improved solution of the UE 14 behaviour for transmissions overlapping with measurement gaps is achieved according to an embodiment by detecting an active measurement gap and receiving data into a transmission buffer of the UE 14. Then the received data triggers an uplink data transmission procedure such as a scheduling request procedure or a random access procedure. Moreover, an evaluation on characteristics information associated with the received data is performed. Based on the performed evaluation, the UE 14 proceeds with the uplink data transmission procedure or the measurement gap procedure. For example, in case the characteristics information associated with the received data is of high priority, the UE 14 continues with the uplink data transmission procedure and cancels the measurement gap procedure. However, if the characteristics information associated with the received data is of low priority, the UE 14 continues with the measurement gap procedure and postpones the uplink data transmission procedure to a later occasion.

For the purpose of this disclosure the term "measurement gap procedure" is to be interpreted as the procedure of the current measurement gap and not the procedure of the measurement activity per se which takes place in the measurement gap.

As mentioned previously, the telecommunications network provides the measurement configuration applicable for the UE 14 in RRC_CONNECTED state. The UE 14 comprises a transmission buffer for receiving and storing data available for transmission.

Figure 2:
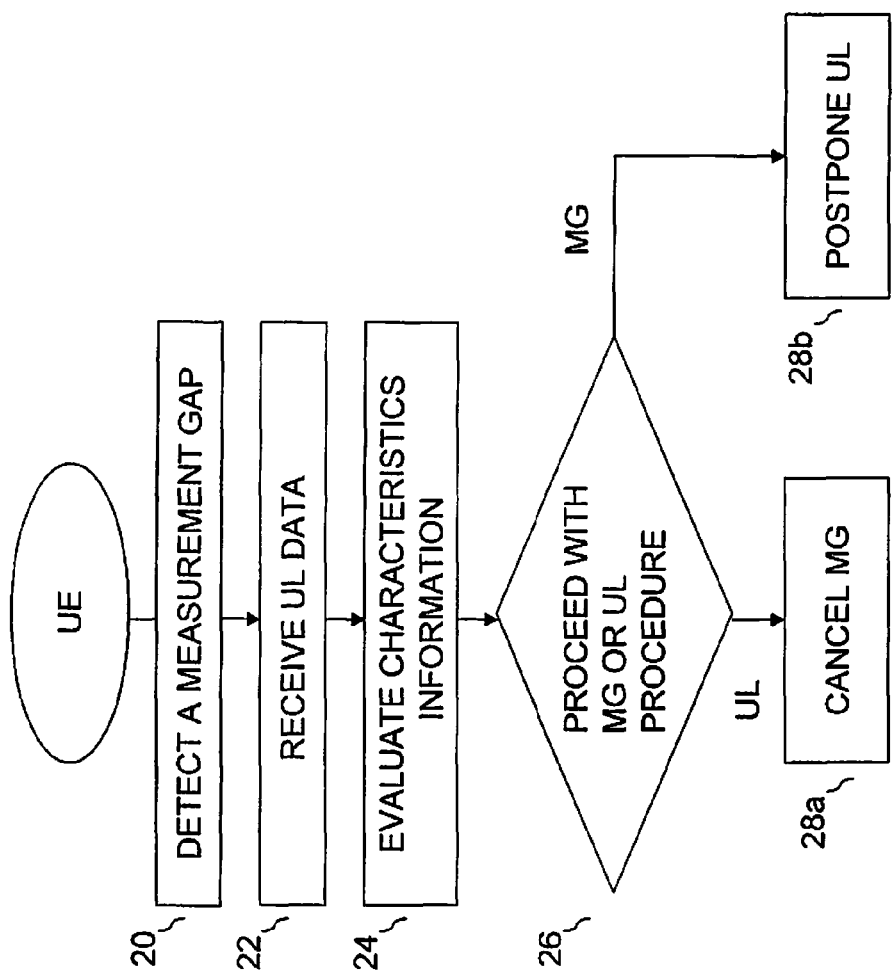
FIG. 2 illustrates a flowchart of the method according to the present invention as performed in a UE.

FIG. 2 illustrates a flowchart showing a method in a UE 14 according to the present invention. In a first step, the UE 14 detects 20 a measurement gap during which the UE 14 is scheduled to perform measurements. In the next step, the UE 14 receives data 22 to be transmitted in the UE transmission buffer. The received data triggers an uplink data transmission procedure. In a further step, the UE 14 performs an evaluation 24 on characteristics information associated with the data received in the receiving step.

In one embodiment the characteristics information comprises a priority value of a logical channel to which the data belongs. The data could belong to a logical channel with high priority such as a Signal Radio Bearer (SRB) or a combination of SRBs or the data could belong to a logical channel with low priority such as a Data Radio Bearer (DRB). In another embodiment the characteristics information comprises a link quality of a link on which the received data is to be transmitted. In yet another embodiment the characteristics information comprises a type of content of the received data i.e. the type of message and its priority. For example, the type of message could be a message providing data for updating of the capabilities of the UE 14 or control data message. In one embodiment of the present invention the characteristics information comprises at least two of the type of content of the received data, the priority value of the logical channel and the link quality.

In the next step of the method, the UE 14 proceeds 26 with the uplink data transmission procedure or with the measurement gap procedure. The decision is based on the performed evaluation in the preceding step. In accordance with the proceeding step 26 the UE 14 cancels 28*a* the measurement gap procedure when it proceeds with the uplink data transmission procedure and postpones 28*b* the uplink data transmission procedure when is proceeds with the measurement gap procedure.

In one embodiment of the present invention, when the data that triggers the uplink data transmission procedure belongs to a logical channel with higher priority value than a preset threshold value, the UE 14 proceeds 26 with the uplink data transmission procedure and cancels 28*a* the measurement gap procedure. For example, the data could belong to a SRB or a combination of SRBs.

Furthermore, if the UE 14 has access to a dedicated PUCCH resource for a scheduling request, i.e. dedicated SR, the UE 14 proceeds 26 with the uplink data transmission procedure i.e. the scheduling request procedure and cancels 28*a* the measurement gap procedure.

Moreover, if the UE 14 has no access to a dedicated PUCCH resource for a scheduling request the received data triggers a random access procedure, the UE 14 proceeds 26 with the uplink data transmission procedure i.e. the random access procedure and cancels 28*a* the measurement gap procedure. Further, the UE 14 also proceeds 26 with the random access procedure and cancels 28*a* the measurement gap procedure when the reception window consisting of a number of sub frames for reception of the random access response partly collides with the detected measurement gap procedure.

On the other hand, if the data that triggers the uplink data transmission procedure belongs to a logical channel with lower priority value than a preset threshold value the UE 14 proceeds 26 with the measurement gap procedure and postpones 28*b* the uplink data transmission procedure until a later occasion. For example, the data could belong to a data radio bearer.

In another embodiment of the present invention the UE 14 proceeds 26 with the uplink data transmission procedure and cancels 28*a* the measurement gap procedure when the performed evaluation on characteristics information indicates that the link quality of the link on which the data is to be transmitted is above a preset threshold value. However, when the link quality is below the preset threshold value the UE 14 proceeds 26 with the measurement gap procedure and postpones 28*b* the uplink data transmission procedure.

In another embodiment of the present invention the UE 14 proceeds with the uplink data transmission procedure and cancels 28*a* the measurement gap procedure when the performed evaluation on characteristics information indicates that the type of content of the received data is control data. However, when the performed evaluation on characteristics information indicates that the type of content of the received data is user data the UE 14 proceeds 26 with the measurement gap procedure and postpones 28*b* the uplink data transmission procedure.

In another embodiment of the present invention the UE 14 performs an evaluation on the characteristics information when the characteristics information comprises at least two of the type of content of the received data, the priority value of the logical channel and the link quality. Thus, the performed evaluation indicates if a value reflecting the interaction of the different pieces of characteristics information is higher or lower than a preset threshold value. The UE 14 proceeds with either the uplink transmission data or the measurement gap procedure based on the performed evaluation.

Figure 3:
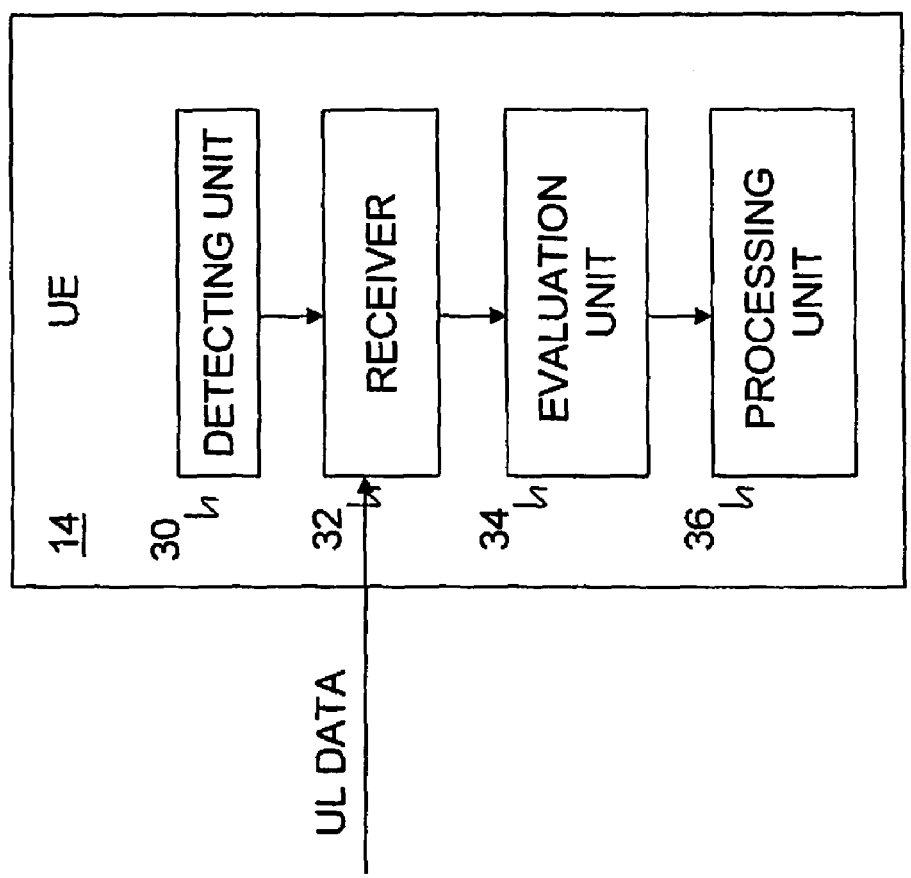
FIG. 3 illustrates a block diagram schematically illustrating an arrangement implemented in a UE in accordance with an embodiment of the present invention.

We now turn to FIG. 3 illustrating a schematically block diagram of the arrangement according to the present invention.

The UE 14 comprises a detecting unit 30 adapted to detect the active measurement gap. It further comprises a receiver 32 adapted to receive data, which is to be transmitted, into the transmission buffer. Additionally, the UE 14 comprises an evaluation unit 34 adapted to evaluate characteristics information associated with the received data in the transmission buffer. The UE further comprises a processing unit 36 adapted to proceed with the uplink data transmission procedure or the measurement gap procedure. In one embodiment of the present invention the processing unit 36 is adapted to cancel the measurement gap procedure when proceeding with the uplink data transmission procedure and to postpone the uplink data transmission procedure when proceeding with the measurement gap procedure.

It should also be noted that the UE 14 could be preconfigured, explicitly or implicitly, by the eNodeB 10 with the RRC protocol or by a MME (Mobility Management Entity) with NAS protocol comprised in the telecommunication system.

The present invention may, of course, be carried out in other ways than those specifically set forth herein without departing from essential characteristics of the invention. The present embodiments are to be considered in all respects as illustrative and not restrictive.

The invention claimed is:

1. A method in a user equipment for priority handling between a measurement gap procedure and an uplink data transmission procedure, which user equipment is comprised in a telecommunication system, the user equipment comprises a transmission buffer for data available for transmission, the method comprises the steps of:
    detecting an active measurement gap;
    receiving data into the transmission buffer, which data triggers the uplink data transmission procedure;
    performing an evaluation on characteristics information associated with the received data; and
    proceeding with the uplink data transmission procedure or the measurement gap procedure based on the performed evaluation.

2. The method according to claim 1, wherein the method further comprises the steps of:
    cancelling the measurement gap procedure when proceeding with the uplink data transmission procedure; and
    postponing the uplink data transmission procedure when proceeding with the measurement gap procedure.

3. The method according to claim 1, wherein the characteristics information comprises a priority value of a logical channel to which the received data belongs.

4. The method according to claim 1, wherein the characteristics information comprises a link quality of a link on which the received data is to be transmitted.

5. The method according to claim 1, wherein the characteristics information comprises a type of content of the received data.

6. The method according to claim 3, wherein when the priority value is higher than a preset threshold value the method proceeds with the uplink data transmission procedure.

7. The method according to claim 6, wherein the logical channel is a signaling radio bearer or a combination of signaling radio bearers.

8. The method according to claim 7, wherein the user equipment has a dedicated PUCCH resource for scheduling requests, and the uplink data transmission procedure is a scheduling request procedure.

9. The method according to claim 7, wherein said detecting step and said performing the evaluation step indicate that a random access channel opportunity collides with the detected active measurement gap or a reception window consisting of a number of sub frames for reception of a random access response at least partly collides with the detected active measurement gap, and the uplink data transmission procedure is a random access procedure.

10. The method according to claim 3, wherein when the priority value is lower than a preset threshold value the method proceeds with the measurement gap procedure.

11. The method according to claim 10, wherein the logical channel is a data radio bearer.

12. The method according to claim 4, wherein when the link quality is above a preset threshold value of link quality the method proceeds with the uplink data transmission procedure.

13. The method according to claim 5, wherein when the type of content of the data is control data the method proceeds with the uplink data transmission procedure.

14. The method according to claim 5, wherein when the type of content of the data is user data the method proceeds with the measurement gap procedure.

15. The method according to claim 1, wherein the user equipment is preconfigured by an eNodeB or a Mobility Management Entity, which is comprised in the telecommunication system.

16. A user equipment for priority handling between a measurement gap procedure and an uplink data transmission procedure, the user equipment being arranged to be comprised in a telecommunication system, the user equipment comprises a transmission buffer for data available for transmission, the user equipment comprising:
    a detecting unit adapted to detect an active measurement gap;
    a receiver adapted to receive data into the transmission buffer, which data triggers the uplink data transmission procedure;
    an evaluation unit adapted to evaluate characteristics information associated with the received data; and
    a processing unit adapted to proceed with the uplink data transmission procedure or the measurement gap procedure based on the performed evaluation.

17. The apparatus according to claim 16, comprising a processing unit adapted to cancel the measurement gap procedure when proceeding with the uplink data transmission procedure and to postpone the uplink data transmission procedure when proceeding with the measurement gap procedure.

18. The apparatus according to claim 16, wherein the characteristics information comprises a priority value of a logical channel to which the received data belongs.

19. The apparatus according to claim 16, wherein the characteristics information comprises a link quality of a link on which the received data is to be transmitted.

20. The apparatus according to claim 16, wherein the characteristics information comprises a type of content of the received data.

21. The apparatus according to claim 18, wherein when the priority value is higher than a preset threshold value the user equipment proceeds with the uplink data transmission procedure.

22. The apparatus according to claim 21, wherein the logical channel is a signaling radio bearer or a combination of signaling radio bearers.

23. The apparatus according to claim 22, wherein the user equipment has a dedicated PUCCH resource for scheduling requests, and the uplink data transmission procedure is a scheduling request procedure.

24. The apparatus according to claim 22, wherein said detection and said evaluation indicate that a random access channel opportunity collides with the detected active measurement gap or a reception window consisting of a number of subframes for reception of a random access response at least partly collides with the detected active measurement gap, and the uplink data transmission procedure is a random access procedure.

25. The apparatus according to claim 18, wherein when the priority value is lower than a preset threshold value the user equipment proceeds with the measurement gap procedure.

26. The apparatus according to claim 25, wherein the logical channel is a data radio bearer.

27. The apparatus according to claim 19, wherein when the link quality is above a preset threshold value of link quality the user equipment proceeds with the uplink data transmission procedure.

28. The apparatus according to claim 20, wherein when the type of content of the data is control data the user equipment proceeds with the uplink data transmission procedure.

29. The apparatus according to claim 20, wherein when the type of content of the data is user data the user equipment proceeds with the measurement gap procedure.

30. The apparatus according to claim 16, wherein the user equipment is preconfigured by an eNodeB or a Mobility Management Entity, which is arranged to be comprised in the telecommunication system.

* * * * *